United States Patent
Prestidge et al.

(10) Patent No.: US 9,235,205 B2
(45) Date of Patent: Jan. 12, 2016

(54) METHOD FOR PRODUCING A MEASUREMENT PROBE PATH ON A NUMERICALLY CONTROLLED MACHINE TOOL

(75) Inventors: Tim Prestidge, Bath (GB); John Charles Ould, Backwell Farleigh (GB)

(73) Assignee: RENISHAW PLC, Wotton-Under-Edge (GB)

( * ) Notice: Subject to any disclaimer, the term of this patent is extended or adjusted under 35 U.S.C. 154(b) by 730 days.

(21) Appl. No.: 10/545,077

(22) PCT Filed: Feb. 13, 2004

(86) PCT No.: PCT/GB2004/000585
§ 371 (c)(1),
(2), (4) Date: Aug. 9, 2005

(87) PCT Pub. No.: WO2004/072740
PCT Pub. Date: Aug. 26, 2004

(65) Prior Publication Data
US 2007/0005178 A1    Jan. 4, 2007

(30) Foreign Application Priority Data
Feb. 13, 2003 (GB) .................................. 0303270.3

(51) Int. Cl.
*G05B 19/401* (2006.01)

(52) U.S. Cl.
CPC .... *G05B 19/401* (2013.01); *G05B 2219/35216* (2013.01); *G05B 2219/37452* (2013.01)

(58) Field of Classification Search
USPC ........... 700/186, 180, 182, 184, 195, 181, 86, 700/87
See application file for complete search history.

(56) References Cited

U.S. PATENT DOCUMENTS

| 4,797,811 A | * | 1/1989 | Kiyokawa et al. ............ 700/181 |
| 4,901,253 A | * | 2/1990 | Iwano et al. .................. 345/419 |
| 4,918,627 A | * | 4/1990 | Garcia et al. .................. 700/182 |

(Continued)

FOREIGN PATENT DOCUMENTS

| DE | 43 42 660 A1 | 6/1995 |
| EP | 0 431 572 A2 | 6/1991 |

(Continued)

OTHER PUBLICATIONS

Schmitt et al., "Fast NC Programming for Optical Measuring Machines," XP000315206, ISSN: 0340-4544, vol. 82, No. 9, pp. 66-68, Sep. 1, 1992 with translation.

(Continued)

*Primary Examiner* — Sean Shechtman
*Assistant Examiner* — Steven R Garland
(74) *Attorney, Agent, or Firm* — Oliff PLC

(57) ABSTRACT

A method for producing a measurement probe 30 inspection path on a machine tool is disclosed which includes the step of running a program e.g. a modified CAM editor program 44 which allows the selection of geometric features of a workpiece 34 to be inspected. Once selected the program will generate a measurement probe path which is included in software for loading into the numeric controller (NC) of the machine tool. The software can have cutting commands together with inspection path instructions either readable by the NC or written as unreadable instructions for use with a p.c. 20 connected to the NC controller and preferably operating at the same time as the NC.

36 Claims, 3 Drawing Sheets

(56) References Cited

U.S. PATENT DOCUMENTS

| | | | |
|---|---|---|---|
| 5,270,918 A | 12/1993 | Seki et al. | |
| 5,444,614 A | 8/1995 | Saito et al. | |
| 5,815,714 A * | 9/1998 | Shridhar et al. | 717/129 |
| 6,009,268 A * | 12/1999 | Reis et al. | 717/146 |
| 6,400,998 B1 | 6/2002 | Yamazaki et al. | |
| 6,424,883 B1 * | 7/2002 | Hosokawa et al. | 700/181 |
| 6,584,515 B1 | 6/2003 | Sakamaki et al. | |
| 2003/0125901 A1 * | 7/2003 | Steffey et al. | 702/155 |
| 2004/0083024 A1 * | 4/2004 | Wang | 700/195 |

FOREIGN PATENT DOCUMENTS

| | | |
|---|---|---|
| EP | 0 879 674 A1 | 11/1998 |
| EP | 1 146 407 A1 | 10/2001 |
| GB | 2 187 308 A | 9/1987 |
| JP | A-59-172008 | 9/1984 |
| JP | A-59-172009 | 9/1984 |
| JP | A-61-049209 | 3/1986 |
| JP | 62-152005 * | 7/1987 |
| JP | A-62-210508 | 9/1987 |
| JP | A-63-184109 | 7/1988 |
| JP | A-63-318605 | 12/1988 |
| JP | A-01-100604 | 4/1989 |
| JP | A-01-296305 | 11/1989 |
| JP | A-1-311372 | 12/1989 |
| JP | A-5-35324 | 2/1993 |
| JP | A-05-092349 | 4/1993 |
| JP | A-5-158523 | 6/1993 |
| JP | A-05-307407 | 11/1993 |
| JP | A-6-231215 | 8/1994 |
| JP | A-7-9302 | 1/1995 |
| JP | A-07-227738 | 8/1995 |
| JP | A-09-274511 | 10/1997 |
| JP | A-2000-180106 | 6/2000 |
| JP | A-2000-207004 | 7/2000 |
| JP | B2-3687980 | 8/2005 |
| WO | WO 97/26595 | 7/1997 |
| WO | WO 98/19821 | 5/1998 |
| WO | WO 98/19821 A1 | 5/1998 |
| WO | WO 01/88647 A1 | 11/2001 |
| WO | WO 02/069061 A1 | 9/2002 |
| WO | WO 03/012561 A2 | 2/2003 |

OTHER PUBLICATIONS

Wocke, "Programming KMGs Automatically," XP000446402, ISSN: 0944-1018, vol. 102, No. 4, pp. 181-186, Apr. 1, 1994 with translation.
Merat et al., "Automated Inspection Planning Within the Rapid Design System," Proceedings of the Interniational Conference on Systems Engineering, Fairborn, Aug. 1-3, vol. Conf. 3, pp. 42-48, Aug. 1, 1991.
European Search Report dated Nov. 19, 2010 issued in European Application No. EP 10 01 1920.
European Search Report dated Nov. 16, 2010 issued in European Application No. 10 01 1332.
Translation of foreign Office Action mailed Nov. 6, 2007 issued in Japanese Application No. 2006-502276.
Abstract of Japan Publication No. JP-A-62-152005 published Jul. 7, 1987.
Translation of Jul. 29, 2011 Office Action issued in Japanese patent application No. 2008-02653.
Jul. 31, 2012 Office Action issued in Japanese Patent Application No. 2010-283647 (with translation).
Jan. 18, 2012 Office Action issued in Chinese Patent Application No. 200480003979.2 (with English Translation).
Chinese Office Action issued in Chinese Patent Application No. 201210122737.1 dated Nov. 22, 2013 (w/ translation).
Aug. 20, 2013 Japanese Office Action issued in Japanese Patent Application No. 2010/283647 (with translation).
Translation of JP-A-05-092349.
Jun. 2, 2015 Office Action issued in Chinese Application No. 201210122737.1.
May 12, 2015 Office Action issued in Japanese Application No. 2010-283647.
Apr. 8, 2014 Office Action issued in Japanese Patent Application No. 2010-283647 (with English Translation).
Aug. 25, 2014 Office Action issued in European Patent Application No. 10 011 920.5.
Aug. 19, 2005 International Preliminary Report on Patentability issued in Application No. PCT/GB2004/000585.
Dec. 14, 2007 Office Action issued in Chinese Application No. 200480003979.2 (with English translation).
Aug. 8, 2008 Office Action issued in Chinese Application No. 200480003979.2 (with English translation).
Jan. 9, 2009 Office Action issued in Chinese Application No. 200480003979.2 (with English translation).
Jul. 17, 2009 Office Action issued in Chinese Application No. 200480003979.2 (with English translation).
Jan. 22, 2010 Decision of Rejection issued in Chinese Application No. 200480003979.2 (with English translation).
Aug. 11, 2011 Re-examination Notification issued in Chinese Application No. 200480003979.2 (with English translation).
Mar. 9, 2010 Office Action issued in Chinese Application No. 200810182729.X (with English translation).
Mar. 9, 2011 Office Action issued in Chinese Application No. 200810182729.X (with English translation).
Aug. 23, 2011 Office Action issued in Chinese Application No. 200810182729.X (with English translation).
Nov. 15, 2007 Office Action issued in European Application No. 04710926.9.
Mar. 6, 2008 Office Action issued in European Application No. 04710926.9.
Jun. 25, 2012 Office Action issued in European Application No. 04710926.9.
Nov. 24, 2010 Search Report issued in European Application No. 10011332.3.
May 15, 2012 Office Action issued in European Application No. 10011332.3.
Dec. 2, 2010 Search Report issued in European Application No. 10011920.5.
Aug. 11, 2011 Office Action issued in European Application No. 10011920.5.
Dec. 19, 2007 Office Action issued in Indian Application No. 3578/DELNP/2005.
Dec. 8, 2008 Office Action issued in Indian Application No. 3578/DELNP/2005.
May 14, 2009 Refusal issued in Indian Application No. 3578/DELNP/2005.
Jun. 27, 2008 Final Rejection issued in Japanese Application No. 2006-502276 (with English translation).
Dec. 18, 2009 Interrogation (including Reconsideration Report) issued in Japanese Application No. 2006-502276 (with English translation).
Jan. 21, 2011 Appeal Decision (patent granted) issued in Japanese Application No. 2006-502276 (with English translation).
Jun. 25, 2010 Office Action issued in Japanese Application No. 2008-026953 (with English translation).
Aug. 20, 2010 Notice of Rejection issued in Japanese Application No. 2006-502276 (English translation only).
Oct. 8, 2014 Office Action issued in Chinese Patent Application No. 201210122737.1 (with translation).
Oct. 21, 2014 Office Action issued in Japanese Patent Application No. 2010-283647 (with translation).
Nov. 21, 2014 Summons to Attend Oral Proceedings issued in European Patent Application No. 10011332.3.
Aug. 17, 2015 Office Action issued in European Application No. 04710926.9.
Aug. 31, 2015 Office Action issued in Indian Application No. 10526/DELNP/2008.

* cited by examiner

METHOD FOR PRODUCING A MEASUREMENT PROBE PATH ON A NUMERICALLY CONTROLLED MACHINE TOOL

BACKGROUND

This invention relates to the control of machine tools having a numeric controller (NC) or the like together with ancillary software, and particularly but not exclusively the control necessary for on-machine measurement.

Conventional NC machine tools make programming for the control of machine movements relatively easy. Programs for operations like cutting are used to control the operation of the NC machine. The programs are most commonly constructed from commands in a low level language i.e. commands that are interpretable directly by the motion control system or other ancillary control system of an NC machine into motion control commands and other ancillary control commands. Examples of low level language command sets are known as a G codes or ISO codes. Ancillary software (e.g. program editors) may be used to aid the generation of such cutting programs. For example, so called CAD/CAM software is available which can generate cutting paths based on the nominal dimensions of a part which is represented in software. A sequence of machine operations is generated by the CAD/CAM or some other editor software in the form of high level language instructions i.e. instructions which are not necessarily interpretable directly by the NC control system. These instructions are turned into G codes that the NC can understand by means of further (post) processing. The exact cutting program resulting from post processing is dependent on the type of NC machine being controlled. Other program editors allow low-level language commands to be generated directly, thereby negating post processing.

It is known to use these low level commands to perform inspection of workpieces. Commonly, the commands cause the machine to pick up an inspection probe rather than a cutter, and to travel to the surface of the workpiece and touch the workpiece to generate a signal. In general the inspection commands are either separate NC programs or sub-programs called from within the cutting program or are input into the high level language instructions by means of specific low level instructions.

CAD/CAM and like editors are also capable of feature based generation of cutting paths. This is a function whereby the programmer need only select a geometric feature e.g. a bore or a flat surface, and the editor will generate a cutting path automatically based on known nominal data for that feature and other available data such as cutter sizes and the amount of material that can be removed at one time. So a bore might be produced by moving a small cutter downwardly in a spiral, and a flat surface might be produced by linear movements of the cutter back and forth. The programmer need not specify the specific cutter movements, just the finished feature.

SUMMARY

According to the invention there is provided a method for producing a measurement probe path on a machine tool for inspecting a workpiece, the method comprising the steps of:
i) running a program containing data relating to geometric features of the workpiece;
ii) selecting a geometric feature of the workpiece to be inspected;

characterised by the steps of:
iii) generating a measurement probe path based on the selected geometric feature; and
iv) converting the generated measurement probe path into a further program for use with a motion control of the machine tool to control the path of the measurement probe.

Preferably the step of running a program containing data relating to the geometric features of workpiece includes running a CAM program which produces pictures of the geometric features on a computer screen.

Preferably the step of selecting a geometric feature of the workpiece to be measured includes selecting a picture of the geometric feature on a computer screen.

Preferably the step of generating a measurement probe path includes at least one of the following:
generating a path for the tool to follow the surface of the workpiece; or
generating a path for touching selected points at the workpiece surface.

Preferably the method further includes any of the steps of:
selecting a path of the measurement probe toward and away from the workpiece;
selecting the speed of the measurement probe; or
selecting the number of points on the surface of the workpiece to be inspected.

Preferably the method further includes the step of:
generating a visualisation of the path of the measurement probe with respect to the workpiece and showing the visualisation on a computer screen.

Preferably the program containing data relating to geometric features of the workpiece is an editing software program.

Preferably the geometric feature selected is an unfinished workpiece feature and the workpiece path is generated accordingly.

Preferably the method includes the step of generating a machine tool cutter path, and the step of converting the generated machine tool cutter path into a further program for use with the NC machine tool controller.

According to another aspect the invention provides an NC machine tool program for use with an NC machine having low level language commands for interpretation by a motion control of an NC machine, the program containing high level language instructions which are not interpretable by the motion control of the NC machine.

Embodiments of this invention thus enables feature based generation of inspection paths within a CAD/CAM environment. Until now such a technique has not been attempted, and it enables much faster generation of inspection routines and the integration of the generation of machining and inspection routines. Attributes including the number of points that must be inspected to define a feature, the geometric position of those points and the path to travel while approaching and leaving those points are created when carrying out such feature based generation of inspection paths. Programming inspection routines within a CAD/CAM environment allows advantageously, the inspection of intermediate features i.e. features that have been only partially completed. The inspection of intermediate features on an NC machine rather than finished features means that any necessary corrections in subsequent cutter paths may be made and the prevention of scrap is possible.

There is the problem of what to do with the inspection data once it is obtained. It is known to run an inspection routine on an NC machine that can change variables within the NC e.g. to jump to different parts of the cutting program or to change a subsequent cutter path by updating a tool size or work coordinate system parameter. However all the processing for these commands takes place within the NC and so there is a limit to what can be performed e.g. only limited mathematics can be performed.

This invention further provides an NC machine tool program for use with an NC machine having low level language commands for interpretation by a motion control of a NC machine, the program containing high level language instructions which are not interpretable by the motion control of the NC machine.

The invention also provides a method of generating an NC program of the type described in the paragraph immediately above.

Preferably the method of generating the NC program includes the steps of:
  producing high level language instructions, e.g. cutting paths and inspection routines, to be included in a NC program, and;
  converting into a low level language only some of those instructions.

In this way the post processed program will have unprocessed instructions remaining. These unprocessed instructions may be inspection routines and may be read by ancillary software when the program is loaded into the NC. The instructions may be converted into low level language commands at the ancillary software and used by the NC when required.

The ancillary software may await machine feedback e.g. from the inspection probe and may process the data and make decisions dependent on the feedback. Further low level language commands may be generated by the ancillary software when the feedback is obtained.

The ancillary software may run within a processor separate from NC.

This invention provides also a method of controlling an NC machine tool control having the steps of:
  providing an NC machine which has an ancillary processor;
  providing an NC program which has some low level commands and some high level instructions;
  providing ancillary software at the ancillary processor;
  loading the program into the NC via the ancillary processor, and;
  causing interpretation of the high level instructions by the ancillary software.

In this way parts of the program which require processing on a processor separate to the NC e.g. feature based inspection routines which require complex processing, may be loaded and interpreted at the ancillary processor. The software may process the instructions while the NC program runs.

DETAILED DESCRIPTION OF EMBODIMENTS

Figure 1:
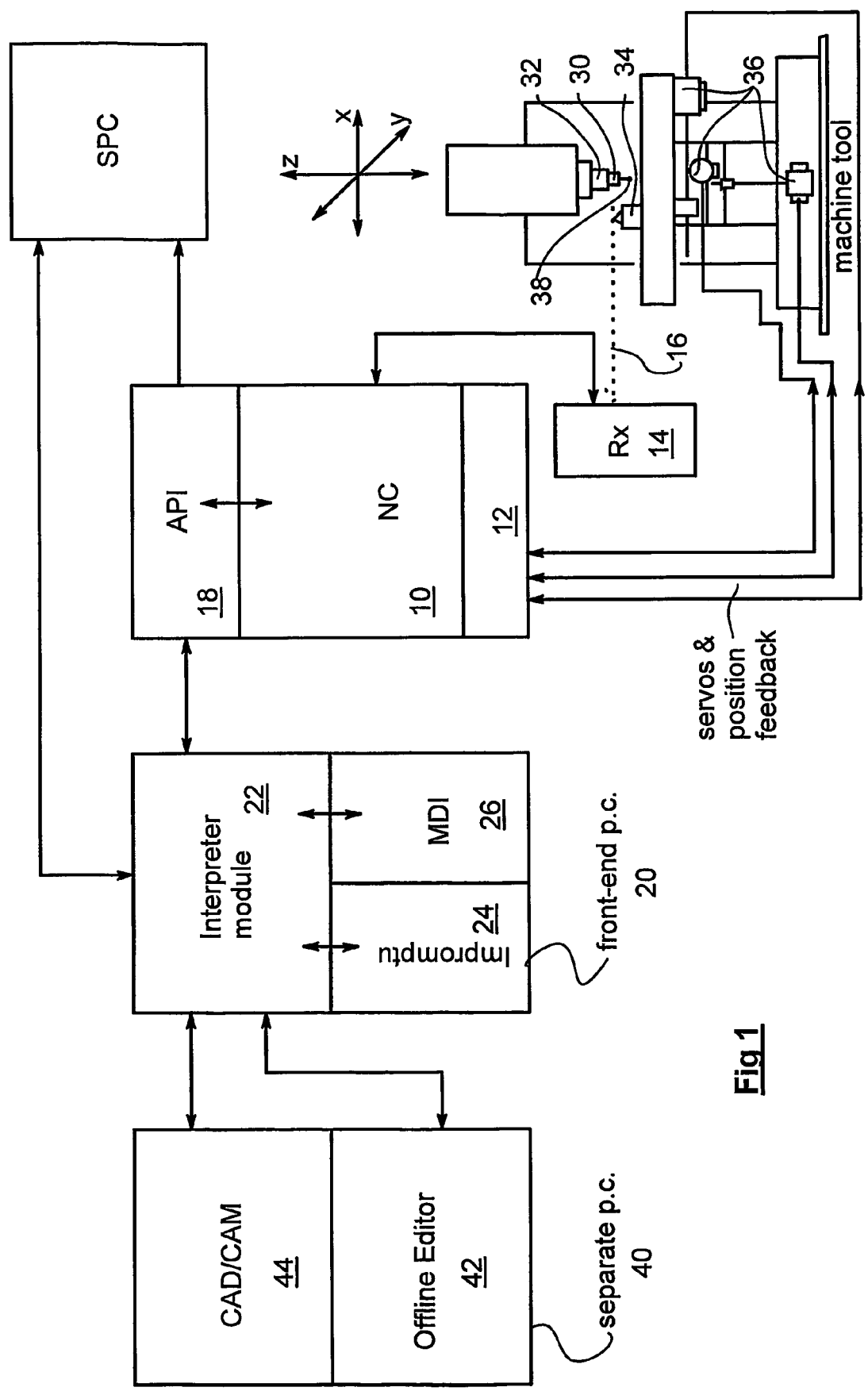
FIG. 1 shows a first NC machine and its control which is suitable for implementing the invention.

Referring to FIG. 1, the NC machine is shown having a conventional numeric controller NC 10. The NC 10 runs programs based on G codes which are turned into movements of the machine by servos 36 controlled by a motion control system 12. Movements are in the x, y and z planes in this example. As well as cutting tools, a measurement probe 30 can be mounted to the spindle 32 of the machine. The probe 30 is moved by the program around a workpiece 34 and can transmit to a receiver 14 data 16 relating to the deviations of its stylus 38 relative to the main body portion of the probe 30. This data can be used to determine workpiece size, geometry and surface finish and the like. An applications programming interface API 18 is used to load programs into the NC 10. The API 18 is fed with programs from a software system operating within an ancillary processor 20 (known as a "front end p.c.") connected to the NC machine. The details of the operation of a system are contained in an as yet unpublished patent application PCT/GB02/03312 and are incorporated herein by reference. The receiver 14 is directly connected to the NC 10 in this example.

The software system of the front end p.c. 20, in this instance, is being used to control what programs are being fed to the NC 10. Decisions concerning the machining process are taken at Interpreter module 22 and are based on data obtained by probing routines run in the NC.

The NC programs can be generated in a high level language editor in the form of a CAD/CAM software 44 running on a separate p.c. 40. Three other high level language editors are shown also:
  i) offline editor software 42 running resident also on the separate p.c. 40 ;
  ii) impromptu software 24 resident on the front end p.c. 20 and
  iii) a manual data input MDI 26 resident also on the front end p.c. 20.

The separate p.c. 40 runs also post processing software which converts high level language into low level language G codes suitable for the NC.

In operation an NC program may be generated, written or downloaded at the front end p.c. 20 e.g. by an impromptu editor 24 or MDI 26. The program could be generated, written or downloaded at the separate p.c. 40 e.g. at the CAD/CAM 44 or Offline editor 42 software. The system will control the program from wherever it comes and has the ability to make decisions based on feedback from the machine. The feedback will come via the API 18 and will include machine position data and probe data.

In this example the CAD/CAM 44 program has been adapted by means of additional software so that, as well as high level instructions generated to perform the necessary cutting operations on workpiece 34, the program can produce similar inspection instructions from data relating to the workpiece to be produced. These inspection instructions are embedded into the cutting instructions as comment fields. The whole program is post-processed in order to convert the instructions into G code commands which are readable by the NC 10. However, the comment fields are not so converted and remain as instructions which are ignored by the NC 10.

This composite program is loaded into the Interpreter 22 and subsequently into the NC 10 via the API 18. This program, now resident in the NC 10, is referred to below as the main program. The instructions in the comment fields of the composite program are recognised by the Interpreter and are used to generate a program (a controlling program) which can control the main program.

As described in our earlier patent application PCT/GB02/03312 the main program will run until it is paused. The pause will continue until the controlling program instructs the main program to continue. The controlling program will be processing feedback data from the machine and making decisions based on that data.

Typical examples of such decisions made during the machining process of a squared component are:

1) Load the main program from the front end p.c. thereby generating a controlling program at the front end p.c. from the instructions in the comments fields of the main program;
2) Run the main program: load the workpiece into the machine and;
3) Load the cutting tool from the tool carousel and machine two sides of the square; replace the cutting tool into the carousel and pause the main program; load and run a probing routine (generated from instructions in comments fields) to select a probe from the carousel and inspect the two sides and replace the probe in the carousel; pause the main program and await restart signal;
4) Send inspection data to the front end p.c. for processing (in parallel with the probing routine in this instance); make a logical decision on the basis of the results and update the controlling program if necessary;
5) If data relating to first two sides of the square is good then send restart signal and carry on machining, or;
6) If probing data indicates more machining required then download suitable path corrections and rewind the main program to send restart signal from step 2) or;
7) Probing data indicates too much material removed so scrap workpiece now and start restart cycle anew.

The above example is very simplified. In practice far more movements and inspection steps are required. However the main program will pause until the system makes a decision, but the decision will be made while the main program runs in the NC 10. So, the pause time will be very short or even zero. If repeat machining is required, the machining paths required could be calculated while the NC 10 runs other instructions to save time.

It can be seen that such a program will save machining time when compared to a conventional program that has simply a cutting program possibly followed by an inspection program.

As well as the composite program described above, it is possible to produce an NC program which is readable wholly by the NC without unreadable high level instructions. Also it is possible to have also an NC program which is readable partially by the NC and which requires sub-programs (usually called macros) and which are called for by the NC program. The addition of comments unreadable by the NC program into the programs mentioned immediately above allows subsequent loading of such programs back into an editor for modification if required.

Figure 2:
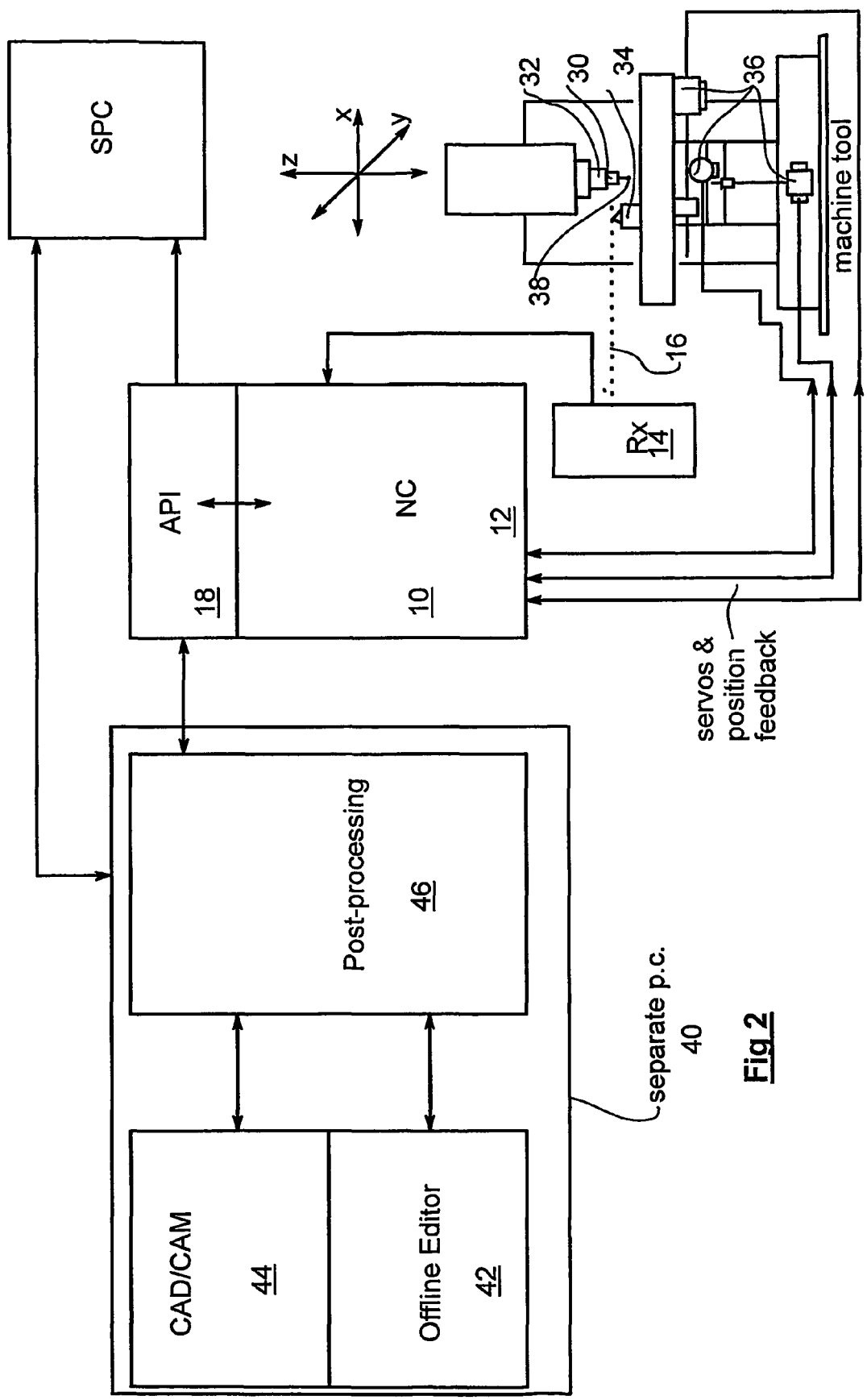
FIG. 2 shows a second NC machine and its control suitable for implementing the invention.

Referring to FIG. 2 a second control system is shown. Although similar to the system shown in FIG. 1, no front end p.c. is present in this system. A separate p.c. 40 is used for program editors 42 and 44, and for post-processing 46. Inspection instructions are converted into G codes during post-processing. In this case the high level instructions are not necessarily included in the G codes. All the instructions required for inspection can be included in the NC program. However the composite program is still generated and feature based generation of inspection routine is possible.

In each of the control systems illustrated in FIGS. 1 and 2 the receiver 14 may also function as a transmitter for sending data to the probe e.g. in order to change its mode of operation.

Figure 3:
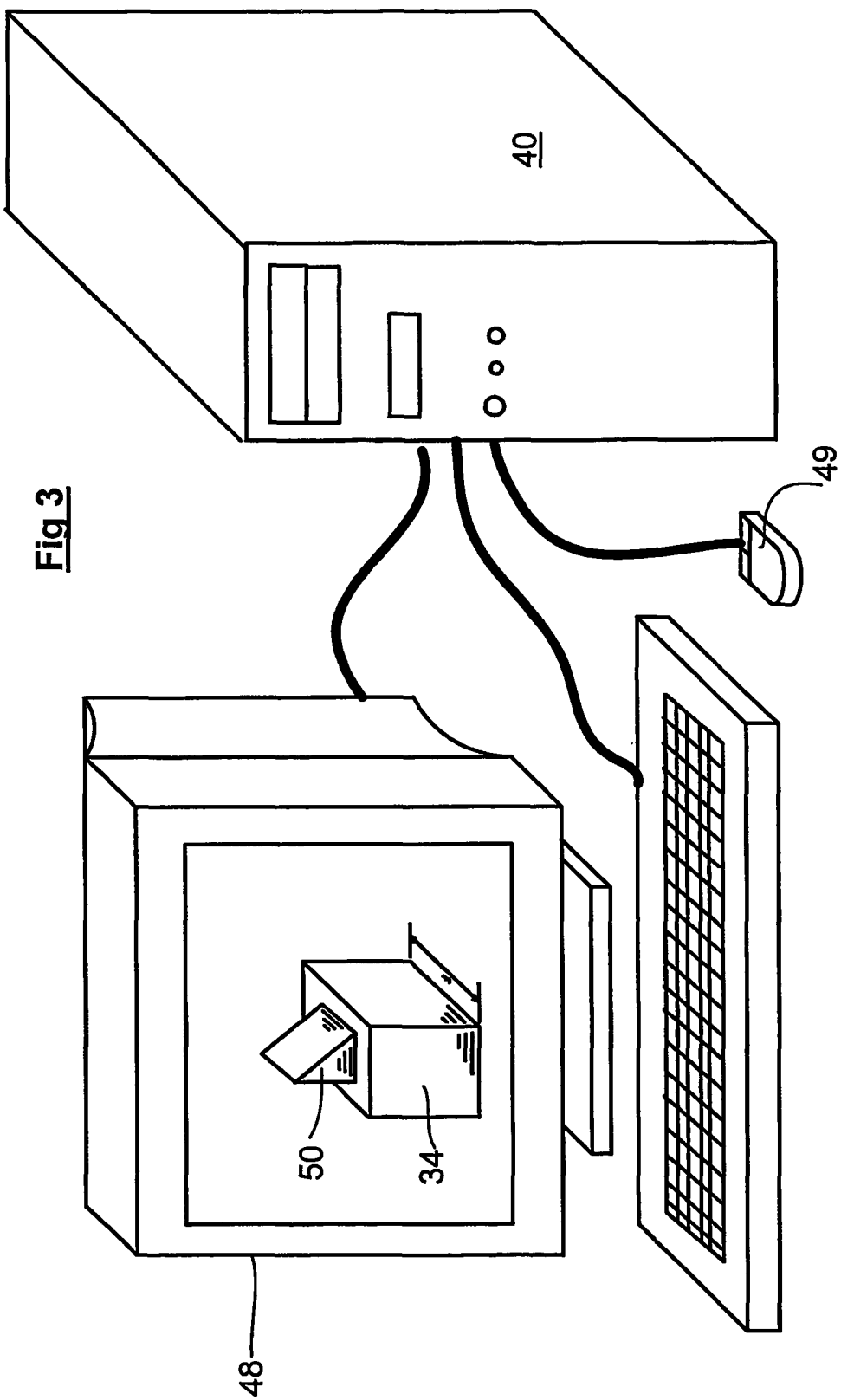
FIG. 3 shows a computer used for implementing the invention.

All NC programs described above can in practice be produced using modified CAM software. FIG. 3 shows the computer 40 running the modified CAM software and screen 48 which can be used to select geometric features 50 of a representation of the workpiece 34 shown on the screen 48. Alternatively any editing software which allows selection of geometric features can be used.

In use an operator will select a geometric feature using a screen pointer control e.g. "clicking" on a feature using a mouse 49 and this will generate an inspection path for probe 30. Additionally the operator can produce cutter paths based on the geometric features. The paths are turned into usable NC commands and/or high level language instructions at the post processing stage carried out after the selection of the geometric features.

Many variants other than those described are envisaged. For example the configuration of hardware may be altered. A single controlling processor could be employed which could run software concurrently to replace some or all of the separate devices shown. More specifically the NC 10 described could be replaced by any type of processor and the separate and front end p.c.s could likewise be any type of processing equipment.

Whilst using the front end p.c. for inspection purposes is described, use of the p.c. for other functions related to the machining process (but not necessarily inspection) are possible e.g. complex mathematics and analysis, modifying tool paths and the programs that define tool paths, producing error recovery actions, formatting printer output, saving results to an external file or database and driving ancillary equipment such as manipulation devices.

The invention claimed is:

1. A method for producing a program for a numeric controller (NC) of a machine tool for inspecting a workpiece, the method comprising in any suitable order the steps of:
   i) providing a path for a cutter of the machine tool; and
   ii) selecting, from a computer aided manufacture (CAM) program containing data relating to a plurality of geometric features of a workpiece, one of the plurality of geometric features of the workpiece that is to be inspected and generating a measurement probe path based on the selected geometric feature; and then
   iii) creating an integrated program containing both the machine tool cutter path and the generated measurement probe path for use with a motion control of the machine tool to control the measurement probe path.

2. A method as claimed in claim 1, wherein selecting the geometric feature of the workpiece to be inspected includes selecting a picture of the geometric feature on a computer screen.

3. A method as claimed in claim 1, wherein generating the measurement probe path includes at least one of the following:
   generating a path for following a surface of the workpiece; or
   generating a path for touching selected points at the surface of the workpiece.

4. A method as claimed in claim 1, further including any of the steps of:
   selecting a path of a measurement probe toward and away from the workpiece;
   selecting a measurement probe speed; or
   selecting a number of points on a surface of the workpiece to be inspected.

5. A method as claimed in claim 1, further including the step of:
   generating a visualisation of the measurement probe path with respect to the workpiece and showing the visualisation on a computer screen.

6. A method as claimed in claim 1, wherein any geometric feature selected is an unfinished workpiece feature.

7. A method as claimed in claim 1, further including the step of generating an NC machine tool program including the step of:

generating an NC program containing low level language commands for interpretation by a motion control of an NC machine, and containing high level language instructions which are not interpretable by the motion control of the NC machine.

8. A method as claimed in claim 7, wherein the step of generating an NC program includes post processing a high level language program containing high level language instructions and converting only some of the high level language instructions into the said low level language commands.

9. A method as claimed in claim 8, further including the step of:
causing reading of the high level language instructions by ancillary software following a loading of the NC program into an NC controller.

10. A method as claimed in claim 9, further including the step of:
converting the high level language instructions into low level language commands at the ancillary software for use by the NC controller when required.

11. A method as claimed in claim 10, further including the step of:
pausing the ancillary software to await feedback from the NC controller and to convert the high level language instructions in a manner dependent on the feedback.

12. A method according to claim 1, including a step of generating the machine tool cutter path based on a selected geometric feature.

13. A method of controlling a machine tool, comprising the steps of:
providing a machine comprising a numeric controller (NC) and an ancillary processor separate to the numeric controller;
providing an NC program that comprises some low level commands that are interpretable by the numeric controller and some high level instructions that are not interpretable by the numeric controller embedded within the low level commands;
providing ancillary software at the ancillary processor;
loading the NC program into the numeric controller; and
causing interpretation of the high level instructions by the ancillary software and controlling the NC program in the numeric controller in response to the interpretation.

14. A method according to claim 13, further including the step of:
subsequently loading the NC program back into an editor for review or modification.

15. A method according to claim 13, wherein the high level instructions are embedded as comments fields.

16. A method according to claim 13, wherein the high level instructions are inspection instructions.

17. A method according to claim 13, wherein the low level commands are cutting instructions.

18. A non-transitory storage medium storing a numeric controller (NC) machine tool program for use with an NC machine tool, the NC machine tool comprising a numeric controller and an ancillary processor, the program comprising low level language commands that are configured to be interpreted by the numeric controller to control the NC machine tool, the program also containing high level language instructions which are configured, to be only interpreted in the ancillary processor, causing the ancillary processor to control the program comprising the low level language commands in the numeric controller, the high level language instructions being embedded within the low level language commands as comment fields that are encoded such that the comment fields are present when the program is run on the NC machine but are not interpretable by the numeric controller.

19. A storage medium as claimed in claim 18, wherein the high level language instructions include instructions readable by ancillary software.

20. A storage medium as claimed in claim 18, wherein the high level language instructions are inspection instructions.

21. A storage medium as claimed in claim 18, wherein the low level language commands are cutting instructions.

22. A machine tool apparatus comprising:
a numeric controller (NC);
an ancillary processor; and
a storage medium comprising an NC program that comprises some low level commands and some high level commands embedded within the low level commands,
the machine tool apparatus being responsive to operation and being configured such that, during operation, the NC program is loaded into the numeric controller and run as a main program, and the ancillary processor interprets the high level commands so as to control the main program.

23. A machine tool apparatus as claimed in claim 22, wherein the low level commands are interpretable by the numeric controller and the high level commands are not interpretable by the numeric controller.

24. A machine tool apparatus as claimed in claim 22, wherein the high level commands are embedded as comments fields.

25. A machine tool apparatus as claimed in claim 22, wherein the high level commands comprise inspection instructions.

26. A machine tool apparatus as claimed in claim 22, wherein the low level commands comprise cutting instructions.

27. A machine tool apparatus as claimed in claim 22, wherein the ancillary processor is configured to convert the high level commands into low level commands for use by the numeric controller when required.

28. A machine tool apparatus as claimed in claim 27, wherein the ancillary processor can be paused to await feedback from the numeric controller and to convert the high level commands in a manner dependent on the feedback.

29. A non-transitory storage medium storing a program which when run on a computer produces a program for a numeric controller (NC) of a machine tool for inspecting a workpiece, the program stored in the storage medium being configured, when run:
to take a path for a cutter of the machine tool;
to enable an operator to select from a computer aided manufacture (CAM) program containing data relating to a plurality of geometric features of a workpiece, one of the plurality of geometric features of the workpiece that is to be inspected and to generate a measurement probe path based on the selected geometric feature; and then
to create the program for the numeric controller as an integrated program containing both the machine tool cutter path and the generated measurement probe path for use with a motion control of the machine tool to control the measurement probe path.

30. A storage medium as claimed in claim 29, wherein the stored program is configured to enable the operator to select the geometric feature of the workpiece to be inspected by selecting a picture of the geometric feature on a computer screen.

31. A storage medium as claimed in claim 29, wherein the stored program is also configured to generate the machine tool cutter path based on a selected geometric feature.

32. A storage medium as claimed in claim 29, wherein the stored program is configured to generate the measurement probe path by at least one of the following:
  generating a path for following a surface of the workpiece; or
  generating a path for touching selected points at the surface of the workpiece.

33. A storage medium as claimed in claim 29, wherein the stored program is further configured to perform any of the steps of:
  selecting a path of a measurement probe toward and away from the workpiece;
  selecting a measurement probe speed; or
  selecting a number of points on a surface of the workpiece to be inspected.

34. A storage medium as claimed in claim 9, wherein the stored program is further configured to generate a visualisation of the measurement probe path with respect to the workpiece and to show the visualisation on a computer screen.

35. A storage medium as claimed in claim 29, wherein the stored program is configured to create the integrated program for the numeric controller containing low level language commands for interpretation by a motion control of an NC machine, and containing high level language instructions which are not interpretable by the motion control of the NC machine.

36. A storage medium as claimed in claim 35, wherein the stored program is configured to create the integrated program for the numeric controller by post processing a high level language, program containing high level language instructions and converting only some of the high level language instructions into the said low level language commands.

* * * * *